(12) United States Patent
Laboureau et al.

(10) Patent No.: US 12,517,273 B2
(45) Date of Patent: Jan. 6, 2026

(54) METHOD FOR MONITORING VIBRATIONS

(71) Applicant: UBY, Paris (FR)

(72) Inventors: Sebastien Laboureau, Rambouillet (FR); Laurent Mareuge, Marly le Roi (FR); Antoine Thierry Charles Surmont, Voisins-le-Bretonneux (FR)

(73) Assignee: COM'IN SAS, Paris (FR)

( * ) Notice: Subject to any disclaimer, the term of this patent is extended or adjusted under 35 U.S.C. 154(b) by 245 days.

(21) Appl. No.: 18/018,727

(22) PCT Filed: Jul. 28, 2021

(86) PCT No.: PCT/FR2021/051413
§ 371 (c)(1),
(2) Date: Jan. 30, 2023

(87) PCT Pub. No.: WO2022/023673
PCT Pub. Date: Feb. 3, 2022

(65) Prior Publication Data
US 2023/0228895 A1    Jul. 20, 2023

(30) Foreign Application Priority Data
Jul. 31, 2020 (FR) ..................... 2008187

(51) Int. Cl.
*G01V 1/28* (2006.01)
*G01H 1/00* (2006.01)
(Continued)

(52) U.S. Cl.
CPC .............. *G01V 1/288* (2013.01); *G01H 1/00* (2013.01); *G01H 3/10* (2013.01); *G01V 1/003* (2013.01)

(58) Field of Classification Search
None
See application file for complete search history.

(56) References Cited

U.S. PATENT DOCUMENTS

| 4,885,707 A | 12/1989 | Nichol et al. | |
| 6,484,109 B1 * | 11/2002 | Lofall | G01H 1/003 |
| | | | 702/56 |

(Continued)

FOREIGN PATENT DOCUMENTS

| EP | 2873492 A1 | 5/2015 |
| KR | 102062161 B1 | 1/2020 |

(Continued)

OTHER PUBLICATIONS

PCT Search Report for PCT/FR2021/051413 (Jul. 28, 2021).
French INPI Search Report for FR2008187 (Apr. 19, 2021).

*Primary Examiner* — Mark A Shabman
(74) *Attorney, Agent, or Firm* — Harness, Dickey & Pierce, P.L.C.

(57) ABSTRACT

The invention describes a method for monitoring vibrations produced by an operating area, comprising the following steps: (E1): dividing an operating frequency range into a plurality of frequency sub-ranges; (E2): for each frequency sub-range, defining an associated vibration threshold; (E3): continuously acquiring vibration measurements produced by the operating area; (E4): periodically transmitting vibration data resulting from the vibration measurements, the vibration data being transmitted to a remote server (200) via an LPWAN network; (E5) detecting a vibration event corresponding to at least one vibration threshold being exceeded in the associated frequency sub-range; (E6): when a vibration event is detected, transmitting a warning to the remote server (200) via the LPWAN network.

12 Claims, 1 Drawing Sheet

(51) Int. Cl.
  *G01H 3/10* (2006.01)
  *G01V 1/00* (2024.01)
  *G01V 1/22* (2006.01)

(56) References Cited

U.S. PATENT DOCUMENTS

| | | |
|---|---|---|
| 9,476,761 B2 | 10/2016 | Olschewski |
| 2003/0014219 A1 | 1/2003 | Shimizu et al. |
| 2003/0212511 A1* | 11/2003 | Carle .................... G01H 1/003 |
| | | 702/56 |
| 2006/0145881 A1 | 7/2006 | Sakatani et al. |
| 2006/0238330 A1 | 10/2006 | Harman et al. |
| 2010/0231348 A1 | 9/2010 | Hugget et al. |
| 2015/0160070 A1* | 6/2015 | Smithers ............... G01M 15/00 |
| | | 702/56 |
| 2017/0178421 A1 | 6/2017 | Worden et al. |
| 2017/0181098 A1 | 6/2017 | Shinohara |
| 2018/0149516 A1* | 5/2018 | Wascat .................... H04W 4/38 |
| 2018/0180465 A1* | 6/2018 | Papanagiotou ..... G06F 11/3058 |
| 2019/0020290 A1 | 1/2019 | Feng et al. |
| 2019/0064034 A1 | 2/2019 | Fayfield et al. |
| 2023/0143027 A1 | 5/2023 | Mareuge et al. |
| 2023/0229383 A1* | 7/2023 | Kemmerer ....... G10K 11/17837 |

FOREIGN PATENT DOCUMENTS

| | | |
|---|---|---|
| NL | 2022301 B1 | 7/2020 |
| WO | WO 2015/086959 A1 | 6/2015 |

\* cited by examiner

METHOD FOR MONITORING VIBRATIONS

CROSS-REFERENCE TO RELATED APPLICATIONS

This application claims priority to PCT Patent Application Serial No. PCT/FR2021/051413 filed on Jul. 28, 2021, which claims priority to French Patent Application Serial No. FR 2008187 filed on Jul. 31, 2020, both of which are incorporated by reference herein.

TECHNICAL FIELD

The present invention relates to the field of the monitoring of vibrations, particularly vibrations produced in the vicinity of areas of operations such as construction sites or industrial sites. More specifically, the invention relates to a method for monitoring vibrations in the vicinity of an area of operations using an autonomous vibration monitoring sensor.

BACKGROUND

The increasing attention paid to nuisances, in particular to nuisances generated by the areas of operations, such as the construction sites or the industrial operation sites in urban areas, requires the development of new tools allowing the detection and the control of these nuisances.

Particularly, the vibration nuisances in the vicinity of these areas of operations must be measured and their evolution must be monitored. In addition, alerts must be generated when exceedances of some vibration thresholds are observed. Documents KR10-2062161 and WO2012/156507 A2 describe portable devices for monitoring the noise and vibration levels using a vibration sensor comprising a battery. These devices are adapted to communicate by radio or Bluetooth transmission.

However, the autonomy of these devices is limited to a few weeks at most. This autonomy is not sufficient for some applications envisaged. particularly, on a construction site lasting several months or a continuous monitoring over several years of an industrial site, these devices must be replaced or recharged at regular intervals due to their limited autonomy, which entails significant costs and number of maintenance operations.

Document EP 2 873 492 A1 describes a portable dosimeter configured to measure vibrations emitted by a machine tool. The dosimeter is worn on the user's wrist and informs the user of the level of vibrations he receives when using the machine tool. Nevertheless, the communications between the elements of the system are carried out exclusively by very short-range networks. Consequently, the elements of the system must be positioned near each other for the dosimeter to ensure the monitoring of the vibrations. In addition, the autonomy of the dosimeter is also limited to approximately a few weeks.

SUMMARY

One objective of the invention is to propose a method for monitoring vibrations in the vicinity of an area of operations, that allows an improved monitoring using a device with easier maintenance compared to the prior art. Another objective of the invention is to propose a vibration monitoring sensor with long autonomy.

For that purpose, the invention describes a method for monitoring vibrations produced by an area of operations, the method being implemented by means of a vibration monitoring sensor comprising a vibration sensor, a battery, a processing unit and a transmission unit, the method comprising the following steps:

E1: dividing an operating frequency range into several frequency sub-ranges;
E2: for each frequency sub-range, defining an associated vibration threshold;
E3: continuously acquiring measurements of vibrations produced by the area of operations, by means of the vibration sensor;
E4: periodically transmitting, at a sending period, vibration data from the vibration measurements, the vibration data being transmitted to a remote server via an LPWAN network, by means of the transmission unit;
E5: detecting a vibration event corresponding to at least one exceedance of a vibration threshold in the associated frequency sub-range, by means of the processing unit;
E6: when a vibration event is detected, transmitting an alert to the remote server via the LPWAN network, by means of the transmission unit.

Some preferred but non-limiting characteristics of the vibration monitoring method described above are as follows, taken individually or in combination:

the division of the operating frequency range into several frequency sub-ranges is carried out per one-third octave;
the frequency sub-ranges have interval lengths different from each other;
the operating frequency range is divided into a number of transmission frequency ranges less than 10;
the operating frequency range is comprised between 1 Hz and 500 Hz;
the LPWAN network is a LoRaWan®, SigFox®, LTE-m or narrowband-IoT type network;
the transmission of the alert during step E6 is carried out periodically, at each alert period during which at least one vibration event is detected, the alert period being shorter than the sending period;
the method further comprises a step of integrating, over at least one integration period, the vibration measurements acquired during the acquisition step E3, the at least one integration period being shorter than the sending period, the vibration data transmitted during step E4 corresponding to a set of the vibration measurements integrated during the sending period;
the step E6 of transmitting an alert comprises the transmission of alert data, the alert data comprising the frequency for which the vibration threshold has been exceeded, an alert vibration data and a vibration threshold exceedance duration;
the method further comprises the following steps:
E7: continuously acquiring noise measurements produced by an area of operations;
E8: detecting a noise event corresponding to a predetermined noise signature;
E9: correlating a detected vibration event with a detected noise event.

According to a second aspect, the invention also describes a sensor for monitoring vibrations produced by an area of operations adapted to implement a method according to the first aspect, the monitoring sensor comprising:

a vibration sensor adapted to continuously acquire measurements of vibrations produced by an area of operations;

a battery;

a processing unit adapted to determine vibration data from the vibration measurements, and to detect a vibration event corresponding to an exceedance of a vibration threshold defined in an associated frequency range; and a transmission unit adapted to transmit data to a remote server via an LPWAN network.

The vibration sensor can comprise a tri-axis accelerometer. The battery can comprise a lithium-ion cell. The monitoring sensor can further comprise a sealed polycarbonate casing. The vibration sensor, the battery, the processing unit and the transmission unit can be integrated into the casing.

According to a third aspect, the invention also describes a system for monitoring vibrations produced by an area of operations, comprising a vibration monitoring sensor according to the second aspect, and a remote server. The system for monitoring vibrations produced by an area of operations can further comprise reporting means comprising a mobile terminal configured to transmit a reporting of a vibration event by a user of the mobile terminal when the user is at a distance below a given threshold of the area of operations. The system for monitoring vibrations produced by an area of operations can further comprise notification means configured to notify a vibration event when the vibration monitoring sensor detects a vibration event, and/or when the reporting means transmit a reporting of a vibration event.

BRIEF DESCRIPTION OF THE DRAWINGS

Other characteristics, aims and advantages of the present invention will appear upon reading the following detailed description, given by way of non-limiting example, which will be illustrated by the following figures.

DETAILED DESCRIPTION

Figure 2:
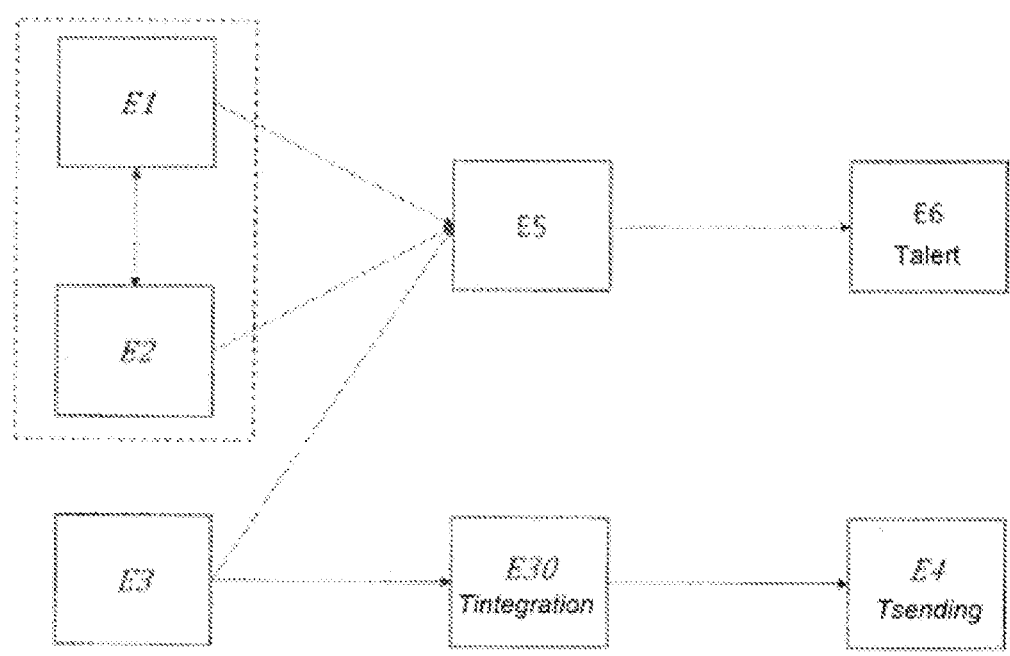
FIG. 2 is a block diagram representing different steps of a vibration monitoring method according to one embodiment of the invention.

A method for monitoring vibrations produced by an area of operations is illustrated by way of non-limiting example in FIG. 2. The method is implemented by means of a vibration monitoring sensor comprising a vibration sensor 10, a battery 20, a processing unit 30 and a transmission unit 40.

The method comprises the following steps:

E1: dividing an operating frequency range into several frequency sub-ranges;

E2: for each frequency sub-range, defining an associated vibration threshold;

E3: continuously acquiring measurements of vibrations produced by the area of operations, by means of the vibration sensor 10;

E4: periodically transmitting, at a sending period Tsending, vibration data from vibration measurements, the vibration data being transmitted to a remote server 200 via an LPWAN network, by means of the transmission unit 40;

E5: detecting a vibration event corresponding to at least one exceedance of a vibration threshold in the associated frequency sub-range, by means of the processing unit 30;

E6: when a vibration event is detected, transmitting an alert to the remote server 200 via the LPWAN network, by means of the transmission unit 40.

The term "area of operations" refers to any area in or near which vibration nuisances are likely to be generated, particularly due to installations or operations likely to generate vibrations. For example, an area of operations can refer to a construction site or an industrial site.

The method described above allows considerably increasing the autonomy of the vibration monitoring sensor, and thus increasing the time between two maintenance operations, while leading to a reliable and accurate monitoring over time of the vibrations and of their evolution. The method described further allows good flexibility in the sensitivity of the detection of a vibration event and the monitoring of the vibrations, by the possible adaptation of the definition of the vibration thresholds, of the frequency sub-ranges, of the sending period, etc.

The acquisition of the vibration measurements is carried out continuously during step E3. Consequently, the vibration data transmitted to the remote server 200 during step E4 reflect the level of vibrations produced by the area of operations at every moment and the evolution of this level of vibrations over time.

The vibration data from the vibration measurements are transmitted periodically during step E4. In other words, the vibration data are not transmitted continuously, but at each sending period Tsending. This periodic transmission allows preserving the autonomy of the monitoring sensor, particularly its battery 20. The sending period Tsending can be defined independently of the criteria for detecting the vibration events. Thus, the vibration data can be evenly transmitted with a view to ensuring a background monitoring of the vibrations produced by the area of operations, while preserving the autonomy of the monitoring sensor. Consequently, the method ensures a monitoring of the level of vibrations and of their evolution, including when no vibration event is detected, i.e. when the vibrations remain below the acceptable vibration thresholds.

In parallel with the periodic sending of vibration data, the method comprises a step E6 of transmitting an alert when a vibration event is detected. The detection of a vibration event is carried out in step E5 as a function of the division of the operating frequency range into frequency sub-ranges. This division carried out in step E1 allows defining the vibration events as a function of vibration thresholds which are associated with the frequency sub-ranges. The vibration thresholds are therefore defined in step E2 as a function of the desired event detection sensitivity, for a frequency sub-range lower than the operating frequency range.

The division of the operating frequency range into different frequency sub-ranges in step E1 thus allows finely adapting the sensitivity of the detection of the vibration events, for example as a function of the frequency of the measured vibrations or of the desired number of alert transmissions, this number being correlated with the autonomy of the device.

Thus, the lower the vibration threshold defined on an associated frequency sub-range, the lower the vibration level leading to the detection of a vibration event. The number of vibration events detected during step E5 and likely to give rise to an alert increases accordingly.

The method described thus allows alerting when the vibration thresholds are reached or exceeded, while avoiding the unnecessary energy-intensive alert transmissions. The autonomy of the monitoring sensor is therefore improved.

The transmission of data during steps E4 and E6 of the monitoring method is a long-distance transmission with low energy data consumption, carried out using a long-range low-consumption technology of the Low-Power Wide Area Network (LPWAN) type. The use of an LPWAN network allows reducing the energy consumption required for the transmissions of data, and thus further increasing the autonomy of the monitoring sensor.

An LPWAN network is characterized by a long range, i.e. a range of several hundred meters, typically comprised between 1 km and 50 km. This long range is obtained in particular through the use of specific frequency bands with a bandwidth of a few KHz, such as the frequency band called "Sub-1 GHz" frequency band of 868 MHz in Europe and 915 MHz in the United States, or the frequency band comprised between 700-900 MHz. This long range is further obtained thanks to the use of very low data rates, for example comprised between 100 bits/s and 1 Mbit/s, generally of the order of a few kbits/s, and thanks to the use of specific modulation classes, such as the narrowband modulation and the spread spectrum modulation.

An LPWAN network is also characterized by low energy consumption, which allows a cell or battery operation for several years. This low energy consumption is particularly obtained thanks to the use of a star topology, through the use of MAC layers of specific types, such as the ALOHA layer, for a simplified medium access method, and thanks to the low data rates.

The LoRaWan®, SigFox®, LTE-m or narrowband-IoT technologies are well-known examples of low-power wide area networks, LPWAN network types. The GSM, WLAN, Bluetooth® or Wi-Fi type networks are not LPWAN networks.

The low throughputs of the LPWAN networks require a selection of the information to be sent and a specific encoding of this information. The division of the operating frequency range into several specific frequency sub-ranges, for example per one-third octave, allows inputting the data obtained into the throughputs of an LPWAN network. Thus, thanks to the transmissions through an LPWAN network, a standard battery 20, such as a 3.6 V battery pack, can provide the vibration monitoring sensor with an autonomy of the order of a few months, for example from 12 to 24 months, while taking vibration measurements regularly, for example every 5 to 20 minutes.

Consequently, the method described above leads to a monitoring of the vibrations produced on an area of operations which is representative of the vibration levels observed at every moment at the level of or near the area of operations, while guaranteeing an improved autonomy of the monitoring sensor. Thus, the monitoring is carried out in a smooth and accurate manner, the maintenance of the monitoring sensor is facilitated and the associated costs are reduced. Particularly, the battery 20 of the monitoring sensor only needs to be replaced or recharged at regular intervals. Typically, such a method can allow monitoring the vibrations of an area of operations for a duration of the order of several months, or even more than a year, without having to change or recharge the battery 20 of the monitoring sensor. No maintenance is therefore necessary over the lifetime of the area of operations when it is less than the autonomy time of the monitoring sensor, which allows reducing the costs accordingly.

Each frequency sub-range is associated with a vibration threshold, defined in step E2. The vibration thresholds can be defined as a function of vibration levels considered acceptable, for example as a function of the type of the area of operations, the duration of the operations, the activity hours of the operations, the urban environment near the area of operations, etc.

The operating frequency range can correspond to a frequency range comprising a set of frequencies which are lower than a maximum frequency Fmax. The maximum frequency Fmax can correspond to a maximum frequency of vibrations measured by the vibration sensor 10. Such an operating range bounded by a maximum frequency allows reducing the volume of vibration data to be transmitted to the only frequency ranges that require supervision, and thus not transmitting vibration data on the frequency ranges that do not require supervision. The battery and the performance of the monitoring sensor are thus improved.

For example, the maximum frequency Fmax can be equal to 500 Hz. The operating frequency range can be comprised between 1 Hz and 500 Hz, i.e. cover a spectrum from 1 Hz to 500 Hz.

The operating frequency range can be divided into a certain number of frequency sub-ranges used for the periodic transmission of the vibration data during step E4, and/or for the transmission of alerts during step E6. The scope, number and ranges of the frequency sub-ranges associated with the vibration thresholds are configurable.

The frequency sub-ranges can have interval lengths different from each other. In other words, one frequency subrange can have a different size than another frequency subrange.

The entire operating range can be divided into frequency sub-ranges each associated with a vibration threshold. Several frequency sub-ranges corresponding to different frequency ranges can correspond to the same vibration threshold.

In a first exemplary embodiment, the division of the operating frequency range into several frequency sub-ranges can be carried out per one-third octave. One-third octave here means a frequency range defined between a lower frequency and a higher frequency, the higher frequency corresponding to the lower frequency of the frequency range multiplied by the sixth root of two. Thus, the frequency sub-ranges are bands with a relatively constant width $\Delta f/f$.

The division during step E1 of the operating frequency range into several frequency sub-ranges per one-third octave allows optimizing both the number of transmissions and the accuracy of the event detection. This division therefore optimizes the quality of the monitoring as well as the autonomy of the monitoring sensor.

In a second exemplary embodiment, the division of the operating frequency range into several frequency sub-ranges can be carried out in a customized manner. The operating frequency range is then divided into a number Pfrequency of frequency sub-ranges. The number Pfrequency of frequency sub-ranges is preferably less than or equal to 10, for example equal to 3.

For an operating frequency range comprised between 1 Hz and 100 Hz and a number Pfrequency of 3, the operating frequency range can be divided into three frequency sub-ranges, which may be as follows: a first frequency sub-range ranging from 1 Hz to 8 Hz, a second frequency sub-range ranging from 8 Hz to 30 Hz and a third frequency sub-range ranging from 30 Hz to 100 Hz. These three frequency sub-ranges can correspond to standards. The frequency range from 1 Hz to 8 Hz can allow the monitoring of vibrations likely to be representative of structural problems, the range from 8 Hz to 30 Hz can allow the monitoring of perceptible vibrations likely to impact the comfort near the area of operations, and the range from 30 Hz to 100 Hz can allow the monitoring of vibrations whose frequencies correspond to an auditory perception of the vibrations.

A vibration threshold can correspond to a vibration acceleration threshold or to a vibration speed threshold, more particularly to a root mean square value of a vibration acceleration or of a vibration speed. In the first exemplary embodiment, the vibration acceleration or the vibration speed can be determined over each one-third-octave band, that is to say over each frequency sub-range, in which the operating frequency range is divided. In the second exemplary embodiment, the vibration speed can be determined over each customized frequency sub-range, i.e. for each of the Pfrequency sub-frequency ranges in which the operating frequency range is divided. The root mean square value of a vibration speed forming the vibration threshold can be comprised, whatever the frequency sub-range associated with the vibration threshold, between 0.005 mm/s and 2 mm/s.

By way of non-limiting example, the table below illustrates examples of vibration thresholds, each vibration threshold being expressed as a root mean square value of a vibration speed (in mm/s). The vibration thresholds are associated with frequency sub-ranges (frequency range, expressed in Hertz). The frequency sub-ranges correspond to third-octave bands of an operating frequency range comprised between 1 Hz and 500 Hz.

TABLE 1

| Frequency subrange (Hz) | Vibration threshold (mm/s) |
| --- | --- |
| 1 | 1.59 |
| 1.25 | 1.13 |
| 1.6 | 0.79 |
| 2 | 0.56 |
| 2.5 | 0.4 |
| 3.15 | 0.29 |
| 4 | 0.2 |
| 5 | 0.16 |
| 6.3 | 0.13 |
| 8 | 0.1 |
| 10 | 0.1 |
| 12.5 | 0.1 |
| 16 | 0.1 |
| 20 | 0.1 |
| 25 | 0.1 |
| 31.5 | 0.1 |
| 40 | 0.09 |
| 50 | 0.08 |
| 63 | 0.079 |
| 80 | 0.059 |
| 100 | 0.039 |
| 125 | 0.019 |
| 160 | 0.015 |
| 200 | 0.011 |
| 250 | 0.008 |
| 315 | 0.007 |
| 400 | 0.006 |
| 500 | 0.005 |

The vibration data transmitted periodically during step E4 can correspond to the vibration measurements acquired by the vibration sensor 10 during step E3, where appropriate after these vibration measurements are sent and processed by the processing unit 30. The vibration data can comprise, for each frequency sub-range and where appropriate for each axis on which the vibrations are measured, acceleration data for example:

a mean acceleration over the sending period Tsending, which corresponds to an arithmetic mean or to the maximum of root means square values of the acceleration over the sending period Tsending; and or a maximum acceleration over the sending period Tsending.

Alternatively or in addition, the vibration data can comprise speed data, the speed being obtained by integration, via an integrating filter, of the acceleration over the sending period Tsending, according to an integration period Tintegration defined below, for example:

a mean speed over the sending period Tsending, which corresponds to an arithmetic mean or to the maximum of root means square values of the speed over the sending period Tsending; and/or a maximum speed over the sending period Tsending.

Particularly, when the division is carried out per one-third octave according to the first exemplary embodiment, the vibration data can comprise acceleration data and/or speed data. The signal corresponding to the vibration measurements from the vibration sensor is cut off per one-third octave using band-pass filters. A mean, for example a root means square value, is applied to the points of the signal for each of the frequency sub-ranges thus defined.

When the division is carried out in a customized manner according to the second exemplary embodiment, the vibration data can comprise speed data. The signal corresponding to the vibration measurements from the vibration sensor is cut off in a customized manner using band-pass filters. A Fourier transform can be applied to the points of the signal for each of the integration periods Tintegration. A mean, for example a root means square value, is applied to the points of the signal obtained, where appropriate after Fourier transform, for each of the customized frequency sub-ranges.

Each of the exemplary embodiments described above allows processing and selecting the information to be sent so as to allow a continuous monitoring of the vibrations, in particular by making it possible to transmit vibration data compatible with the low throughputs of the LPWAN networks. The sending period Tsending can be comprised between 5 minutes and 60 minutes, for example comprised between 10 minutes and 30 minutes, for example be equal to 15 minutes. In the latter case, the vibration data from the vibration measurements are transmitted during step E4 by the transmission unit 40 every 15 minutes.

The LPWAN network through which the vibration data and, where applicable, the alerts are transmitted can be a LoRaWan®, SigFox®, LTE-m or narrowband-IoT type network. Thus, the transmission of the vibration data and/or of the alerts during steps E4 and E6 can be carried out over a long distance, for example of the order of several kilometers, or even greater than ten kilometers, while preserving the autonomy of the device. The transmission protocol of the vibration data and/or of the alerts can correspond to a LoRa public or private communication protocol.

The transmission of the alert during step E6 can be carried out periodically, at each alert period Talert during which at least one vibration event is detected. The transmission unit 40 is then configured to transmit the alerts to the remote server 200 at each alert period Talert during which a vibration event is detected. Thus, once a vibration event has been detected in step E5, the alert is transmitted at the latest after a duration corresponding to the alert period Talert. Furthermore, the detection of a vibration event, even if it persists over time, does not lead to a multiplication of the alerts, only one alert being sent per alert period Talert. The periodic transmission of the alerts corresponding to the vibration events during step E6 further saving the autonomy of the monitoring sensor. Indeed, the vibration events are not transmitted continuously as soon as they are detected and every moment they are detected, but only at each alert period Talert, and only in case a vibration event has actually been detected during step E5.

The alert period Talert may be shorter than the sending period Tsending. Thus, when a vibration event is detected during step E3, the alert is transmitted quickly to the remote server 200, in a shorter time interval than that of the sending of the vibration data that correspond to a background monitoring of the level of vibrations of the area of operations. The user can thus be quickly alerted in case a vibration threshold is reached or exceeded. The alert period Talert can be defined depending on requirements for the speed of transmission of an alert representative of a vibration event. The alert period Talert can be comprised between 30 seconds and 60 minutes, for example comprised between 1 minute and 10 minutes, for example be equal to 2 minutes.

The alert can be transmitted periodically during step E6 as long as the vibration event is detected. At each alert period Talert, an alert is thus transmitted. When the duration of the vibration event exceeds a maximum time, the alert may no longer be sent. Thus, the occurrence of a vibration event for a long duration does not lead to a multiplication of the alerts, and the autonomy of the monitoring sensor is thus preserved.

The maximum time can be comprised between 10 minutes and 5 hours, for example between 30 minutes and 2 hours, for example be equal to 1 hour. For example, when the alert period Talert is 2 minutes and the maximum time is 1 hour, the alert upon detection of a vibration event is transmitted no later than 2 minutes after the detection of the vibration event. The alert is then transmitted periodically every 2 minutes for the entire duration during which the event is detected. Beyond one hour, i.e. 30 alerts transmitted, the alert is no longer sent, even if the vibration event continues to be detected.

The method can further comprise a step E30 of integrating, over at least one integration period Tintegration, the vibration measurements acquired during the acquisition step E3. The at least one integration period Tintegration is shorter than the sending period Tsending. The vibration data transmitted during step E4 correspond to a set of the vibration measurements integrated during the sending period Tsending. In other words, the vibration measurements are acquired continuously by the vibration sensor 10 in step E3. A sending period Tsending can be divided into several integration periods Tintegration. The step E30 of integrating the vibration measurements to deduce therefrom the vibration data to be transmitted can be carried out by the processing unit 30 of the monitoring sensor.

A vibration data can substantially correspond to a mean value of the vibration measurements acquired over the integration period Tintegration. The integration of the vibration measurements is repeated for each integration period Tintegration of the sending period Tsending. The whole comprising all the mean values of the vibration measurements over each integration period Tintegration is transmitted during step E4, at each sending period Tsending. For example, the vibration measurements acquired by the vibration sensor can correspond to accelerations, and the vibration data once integrated correspond to speeds. The integration of the vibration measurements acquired over integration periods Tintegration allows reducing the stream of vibration data transmitted compared to a transmission of all the vibration measurements, while continuing to ensure a detailed monitoring of the vibrations. The integration period Tintegration can be chosen as a function of the desired vibration monitoring accuracy and of the monitoring sensor autonomy. The smaller the integration period Tintegration, the closer the monitoring is to a continuous monitoring at every moment. The higher the integration period Tintegration, the smaller the amount of vibration data to be transmitted, and therefore the more the autonomy of the monitoring sensor is increased.

The integration period Tintegration can be comprised between 0.5 seconds and 1 minute, for example comprised between 1 second and 20 seconds, for example less than or equal to 5 seconds, for example be equal to 10 seconds. For an integration period Tintegration of 10 seconds and a sending period Tsending of 15 minutes, the vibration measurements acquired during step E3 are integrated per periods of 10 seconds. Thus, during the 15 minutes a sending period Tsending lasts, a set of 90 integrated vibration measurements are generated. This set constitutes the vibration data, which are transmitted every 15 minutes to the remote server 200. The step E5 of detecting a vibration event can correspond to a detection of an exceedance of the vibration threshold in the associated frequency range for a predetermined exceedance duration.

Thus, no account shall taken of an exceedance of a short vibration threshold, i.e. which takes place for a duration smaller than the predetermined exceedance duration. The predetermined exceedance duration is defined as a function of the sensitivity of the desired event detection. A predetermined exceedance duration can be defined for each frequency sub-range and each associated vibration threshold. Thus, the accuracy of the event detection is improved and is adapted according to the vibration nuisance.

The predetermined exceedance duration can for example correspond to the integration period Tintegration: thus, an exceedance of the vibration threshold by the vibration data for an exceedance duration greater than the integration period Tintegration, therefore more than a few seconds, leads to the detection of a vibration event.

The exceedance of the vibration threshold can correspond to a vibration level strictly above the vibration threshold. Alternatively, the exceedance of the vibration threshold can correspond to a vibration level substantially equal to or above the vibration threshold.

The step E6 of transmitting an alert can comprise the transmission of alert data. The alert data comprise the frequency for which the vibration threshold has been exceeded, an alert vibration data and a vibration threshold exceedance duration. The alert data thus correspond to the data relating to the detected event which are necessary for the processing of the alert by the remote server 200. The frequency for which the vibration threshold has been exceeded transmitted in step E6 can correspond to a single frequency, to a plurality of frequency values or to a frequency sub-range.

The exceedance duration corresponds to the time during which the vibration level remains equal to or above the vibration threshold for the frequency sub-range for which the event is detected. The exceedance duration can correspond to a number of integration periods during which the vibration threshold is reached or exceeded, or strictly exceeded. The alert vibration data transmitted in step E6 can correspond to an acceleration or to a measured speed, where appropriate to a set of the accelerations or speeds measured on each of the axes of the vibration sensor 10, particularly to an acceleration or to a speed measured for the frequency for which the vibration threshold has been exceeded.

When several vibration events are detected concomitantly, the alert data can be transmitted for each detected vibration event. The alert data can further comprise at least one maximum speed value over a given frequency sub-range, for example four maximum speed values over the frequency sub-ranges used depending on the operating mode.

The alert data can further comprise a storage file comprising part or all of the measurements acquired by the vibration sensor 10 over a certain duration. Particularly, when the vibration sensor 10 comprises a three-axis accelerometer, the alert data can comprise a 30-second CSV (Comma-separated values) storage file for storing all the measurement data from the three axes of the accelerometer. The storage file can be accessible in BLE or on a storage means of the monitoring sensor, such as an SD (Secure Digital) storage card.

The vibration monitoring method can further comprise the following steps:
   E7: continuously acquiring noise measurements produced by an area of operations;
   E8: detecting a noise event corresponding to a predetermined noise signature;
   E9: correlating a detected vibration event with a detected noise event.

The noise measurements can be acquired during step E7 by a noise sensor. The predetermined noise signature can correspond to a noise signature characteristic of the operation of a noise and/or vibration nuisance source, such as a jackhammer, a hammer drill, etc.

The vibration event is detected during step E5, and the noise event is detected during step E8. When a vibration event and a noise event are detected concomitantly, i.e. when they correspond to events taking place substantially at the same time, the two events can be correlated, i.e. they are processed as coming from the same source of nuisance and corresponding to the same location.

These steps E7, E8 and E9 therefore allow correlating a vibration event with a noise event, with a view to determining the source and location of the vibration event. Thus, it is possible to determine whether the vibration event comes from a jackhammer, a percussion drill, etc. This allows improving the tracking of the nuisances in the vicinity of the area of operations.

The method can further comprise a step of detecting an event from local residents. An event from local residents can be a noise or vibration event reported by a local resident. For example, the method can comprise a step of reporting a vibration event by a local resident, the reporting being carried out through reporting means such as a mobile terminal of the local resident, when the local resident is at a distance below a given threshold of the area of operations. The method can comprise a step of transmitting, by the mobile terminal, the reporting of the vibration event.

The method can further comprise a step of notifying a vibration event, through notification means, when a vibration event is detected by the vibration monitoring sensor, and/or when a vibration event is reported by a local resident. Thus, the vibration monitoring method takes into account the feeling of the local residents near the area of operations. The reporting of the inconveniences felt by the local residents, correlated with the data of the sensors, allows obtaining even more precise data on the potential nuisances due to the area of operations, and adapting the operations accordingly. When several events from local residents are detected, the events from local residents following similarity, geographical proximity and/or temporality rules can be grouped together.

When a vibration event is detected with a consistent temporality of an event from local residents, the vibration event and the event from local residents can be correlated. As a variant, when an event from local residents is detected without a vibration event being detected, the event from local residents can be associated with a measurement of vibrations performed by the vibration sensor 10 concomitantly with the detected event from local residents. The vibration thresholds can be adapted accordingly, for example be lowered so as to lead to the detection of this vibration event based on the vibration measurements associated with the event from local residents.

The method can further comprise a preventive detection step corresponding to a detection of a predetermined vibration signature. The vibration signature can correspond to a combination of vibration thresholds associated with given frequency ranges and/or given exceedance durations. The vibration signature can be representative of the operation of a given source of nuisances. The predetermined vibration signature can be considered inconvenient on a given area of operations, at a given time of the day or night, at a certain time of year, etc.

The method can comprise, when such a predetermined vibration signature is detected, a step of transmitting a preventive alert. The preventive alert can be transmitted to a remote server 200 via an LPWAN network by means of the transmission unit 40, and the transmission can be carried out periodically at each preventive alert period during which a preventive alert is detected. The preventive alert period can correspond to the alert period Talert. This preventive alert system allows anticipating any complaints related to nuisances, in particular to vibration nuisances, in the vicinity of the area of operations.

Figure 1:
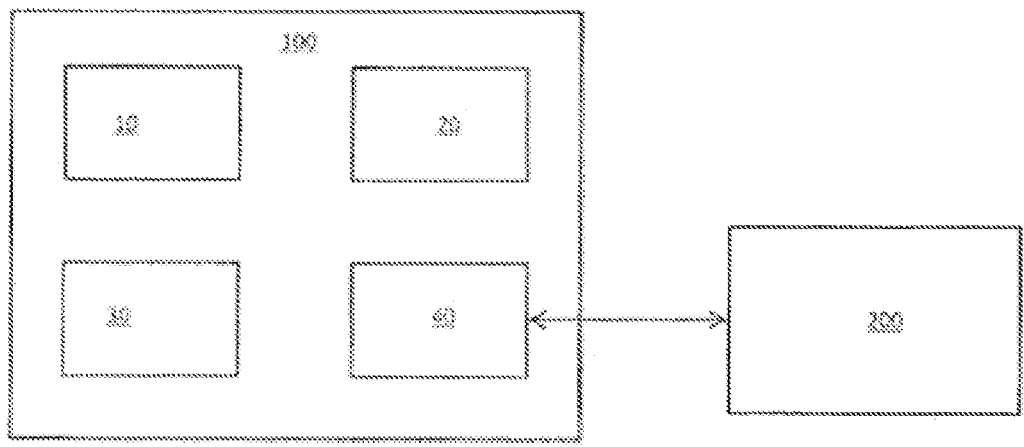
FIG. 1 schematically illustrates an architecture of a vibration monitoring sensor according to one embodiment of the invention.

A sensor for monitoring vibrations produced by an area of operations adapted to implement the method described above is illustrated by way of non-limiting example in FIG. 1, and comprises:
   a vibration sensor 10 adapted to continuously acquire measurements of vibrations produced by an area of operations;
   a battery 20;
   a processing unit 30 adapted to determine vibration data from the vibration measurements, and to detect a vibration event corresponding to an exceedance of a vibration threshold defined in an associated frequency range; and
   a transmission unit 40 adapted to transmit data to a remote server 200 via an LPWAN network.

The processing unit 30 of the monitoring sensor can comprise a microprocessor adapted to detect a vibration event and, where appropriate, generate vibration data from the vibration measurements acquired during step E3. The processing unit 30 can comprise means for transmitting data, such as the vibration data and/or the alert data, to the transmission unit 40.

The transmission unit 40 of the monitoring sensor can be an LPWAN technology transmission unit 40, comprising a transmitter module allowing transmissions through LPWAN technologies. The transmission unit 40 can be configured to perform a transmission via an LPWAN network based on predetermined criteria, or each time the transmission unit 40 receives data from the processing unit 30.

The battery 20 of the monitoring sensor can comprise one or several non-rechargeable cells connected in series, or be rechargeable by a charger. More particularly, the battery 20 of the monitoring sensor can be a standard battery 20, such as a 3.6 V battery pack, or can comprise a lithium-ion cell. Such a lithium-ion cell has a high autonomy, for example of several months or more than a year or of the order of 2 or 3 years. Thus, with a standard or lithium-ion battery 20, the monitoring sensor can acquire the vibration measurements and ensure their transmission to the remote server for a long duration, which can be greater than a year, without requiring replacement or recharging of its battery 20, thus limiting the number of maintenance operations and the associated costs.

The vibration sensor 10 can comprise a single-axis or multi-axis accelerometer, for example a tri-axis accelerometer. The vibration measurements can correspond to acceleration and/or speed amplitude measurements. In the case of a multi-axis accelerometer, each axis can be processed independently. More particularly, the vibration sensor 10 can comprise a digital accelerometer of 16-bit MEMS type, adapted to read the vibrations on three axes. Such a MEMS accelerometer is easy to use and consumes less energy than a piezoelectric-type sensor. In addition, the MEMS accelerometer allows providing a digital signal, therefore already preprocessed. The sampling and the processing of the information, in particular due to the division of the operating frequency range into several frequency sub-ranges, is compatible with the use of such a MEMS accelerometer. The MEMS accelerometer can particularly allow obtaining acceleration measurements per one-third octave, and is therefore compatible with a division of the operating frequency range per one-third octave. The duration of integration of the measurements from the MEMS accelerometer is typically less than 5 seconds, which is compatible with the continuous monitoring of the vibrations.

The vibration sensor, such as the MEMS accelerometer, can be adapted to accurately measure the vibrations in a frequency spectrum substantially corresponding to the operating frequency range, for example in a frequency spectrum ranging from 1 Hz to 500 Hz.

The vibration sensor 10, particularly the accelerometer, can be adapted to measure the vibrations with a low noise level in relation to the defined vibration thresholds. The sampling frequency of the vibration sensor 10, that is to say the number of measurements performed per second by the vibration sensor 10, can go up to 6 kHz to perform processing operations without disturbing the measurements. The resolution of the speed measurement can be of the order of 0.1 µm/s. Such a vibration sensor 10 allows providing reliable vibration measurements undisturbed by the operation of the vibration sensor 10, and this over the entire operating frequency range.

The vibration sensor 10 offers high performance and optimal reliability with a reduced space requirement. The vibration sensor 10 requires no external connection. Its installation is particularly simple thanks to the various accessories, such as an installation template, dowels, screws and the options (abutment, glue).

The monitoring sensor can further comprise a sealed polycarbonate casing 100. The vibration sensor 10, the battery 20, the processing unit 30 and/or the transmission unit 40 are integrated into the casing 100. The casing allows protecting the electronics of the device from common external disturbances in the vicinity of an area of operations such as a construction site, for example water and dust. The reliability of the measurements is increased and the maintenance on the monitoring sensor is further reduced by preserving the lifetime of its components.

More specifically, the casing 100 can be an IP65 sealed polycarbonate casing. The casing 100 is then protected against the water jets from all directions and totally protected against dust. The dimensions of the casing 100 can be 12.5 cm×8 cm×5.5 cm. The casing 100 can weigh between 200 and 400 grams, for example 280 grams.

The monitoring sensor can further comprise storage means adapted to store, by means of software embedded in the sensor and for example in the form of one or several files, vibration measurements and/or vibration data and/or alert data, and to recover these data for their further processing.

The storage means can be adapted to record the content of the messages to be transmitted during steps E4 and E6, for example in case the LPWAN network is not available and in case the vibration and/or alert data therefore cannot be instantly transmitted. The storage means can be adapted to record, for example in a CSV storage file, a certain duration of all the measurement data from the vibration sensor 10 when the monitoring sensor detects a vibration event. For example, the storage means can record 30 seconds of all the data from the three axes of the accelerometer when the vibration sensor 10 is an accelerometer and detects a vibration event. The storage means can further be adapted to retrieve the content of the messages to be transmitted and/or the recorded measurement data, with a view to a subsequent processing.

The storage means can comprise a dedicated electronic card, such as an SD type memory card. A dedicated electronic card consumes less energy than a PC or a geophone, which allows preserving the autonomy of the monitoring sensor. The electronic card is used as a rotating buffer. Once the electronic card is full, the files containing the messages to be transmitted and/or the oldest recorded measurement data can be deleted. The storage space of the electronic card is thus released according to the age of the files stored therein.

In a first embodiment, the data files can be recovered by physically accessing the storage means, for example by opening a cover of the casing 100 of the monitoring sensor, then by copying the contents of the storage means and then putting them back in place, or by replacing them with new storage means. In a second embodiment, the data files can be recovered by transmitting them to an external module via a remote connection, for example via a Bluetooth connection.

A system for monitoring vibrations produced by an area of operations can comprise a vibration monitoring sensor as described above and a remote server 200. The remote server 200 is adapted to process, for example in real time, the vibration data and the alerts received.

The remote server 200 is adapted to undertake some actions, as a function of the data transmitted during the transmission steps E4, E6. The actions undertaken can comprise the sending of alerts to the user and/or the displaying of data, such as the vibration data or the alert data, etc.

For example, the data display can be carried out through an internet platform comprising a dashboard to display the vibration data and/or the alert data. The vibration monitoring system can comprise reporting means comprising a mobile terminal configured to transmit a reporting of a vibration event by a user of the mobile terminal when the user is at a distance below a given threshold of the area of operations. The vibration monitoring system can further comprise notification means configured to notify a vibration event when the vibration monitoring sensor detects a vibration event, and/or when the reporting means transmit a reporting of a vibration event.

Other embodiments can be envisaged and those skilled in the art can easily modify the embodiments or exemplary embodiments set out above or envisage others while remaining within the scope of the invention.

The invention claimed is:

1. A method for monitoring vibrations produced by an area of operations, the method being implemented by means of reporting means comprising a mobile terminal and by means of a vibration monitoring sensor comprising a vibration sensor, a battery, a processing unit, a transmission unit of long-range low-consumption technology of a Low-Power Wide Area Network (LPWAN) type, said transmission unit comprising a transmitter module allowing transmissions via an LPWAN network, the method comprising the following steps:
   (E1): dividing an operating frequency range into several frequency sub-ranges;
   (E2): for each frequency sub-range, defining an associated vibration threshold;
   (E3): continuously acquiring vibration measurements, the vibrations being produced by the area of operations, by means of the vibration sensor;
   (E4): periodically transmitting, at a sending period (Tsending), vibration data from the vibration measurements, the vibration data being transmitted to a remote server via the LPWAN network, by means of the transmission unit;
   (E5): detecting a vibration event corresponding to at least one vibration measurements exceeding the vibration threshold associated to the frequency sub-range in which the vibration measurements is included, by means of the processing unit;
   (E6): when a vibration event is detected, transmitting an alert to the remote server via the LPWAN network, by means of the transmission unit;
   transmitting a reporting of a vibration event by a user of the mobile terminal when the mobile terminal of the user is below a given distance threshold from the area of operations; and
   reporting a vibration event by a local resident, the reporting being carried out through the mobile terminal of the local resident, when the mobile terminal of the local resident is below the given distance threshold from the area of operations.

2. The vibration monitoring method according to claim 1, wherein the division of the operating frequency range into several frequency sub-ranges is carried out per one-third octave.

3. The vibration monitoring method according to claim 1, wherein the frequency sub-ranges have interval lengths different from each other.

4. The vibration monitoring method according to claim 1, wherein the LPWAN network is a LoRaWan, SigFox, LTE-m or narrowband-IoT type network.

5. The vibration monitoring method according to claim 1, wherein the transmission of the alert during step (E6) is carried out periodically, at each alert period (Talert) during which at least a vibration event is detected, and wherein the alert period (Talert) is shorter than the sending period (Tsending).

6. The vibration monitoring method according to claim 1, further comprising a step (E30) of integrating, over at least one integration period (Tintegration), the vibration measurements acquired during the acquisition step (E3), the at least one integration period (Tintegration) being shorter than the sending period (Tsending), wherein the vibration data transmitted during step (E4) correspond to a set of the vibration measurements integrated during the sending period (Tsending).

7. The vibration monitoring method according to claim 1, wherein the step (E6) of transmitting an alert comprises the transmission of alert data, the alert data comprising the frequency for which the vibration threshold has been exceeded, an alert vibration data and a vibration threshold exceedance duration.

8. The vibration monitoring method according to claim 1, further comprising the following steps:
   (E7): continuously acquiring noise measurements produced by an area of operations;
   (E8): detecting a noise event corresponding to a predetermined noise signature;
   (E9): correlating a detected vibration event with a detected noise event.

9. A system for monitoring vibrations produced by an area of operations, comprising a vibration monitoring sensor, a remote server, and reporting means;
   wherein the vibration monitoring sensor comprises:
      a vibration sensor adapted to continuously acquire vibration measurements, the vibrations being produced by an area of operations;
      a battery:
      a processing unit adapted to determine vibration data from the vibration measurements, and to detect a vibration event corresponding to a vibration measurement exceeding a vibration threshold associated to a frequency sub-range in which the vibration measurements is included; and
      a transmission unit of long-range low-consumption technology of a LPWAN (Low-Power Wide Area Network) type, said transmission unit comprising a transmitter module allowing transmissions via an LPWAN network, said transmission unit being adapted to transmit data to the remote server via the LPWAN network;
   and wherein the reporting means comprises a mobile terminal configured to transmit a reporting of a vibration event by a user of the mobile terminal when the mobile terminal of the user is below a given distance threshold from the area of operations, and further configured to carry out a reporting of a vibration event by a local resident, when the mobile terminal of the local resident is below the given distance threshold from the area of operations.

10. The system for monitoring vibrations produced by the area of operations according to claim 9, wherein the vibration monitoring sensor comprises a tri-axis accelerometer and wherein the battery comprises a lithium-ion cell.

11. The system for monitoring vibrations produced by the area of operations according to claim 9, wherein the vibration monitoring sensor further comprises a sealed polycarbonate casing, and wherein the vibration sensor, the battery, the processing unit and the transmission unit are integrated into the sealed polycarbonate casing.

12. The system for monitoring vibrations produced by an area of operations according to claim 9, further comprising notification means configured to notify a vibration event when the vibration monitoring sensor detects a vibration event, and/or when the reporting means transmit a reporting of a vibration event.

* * * * *